US010888192B2

(12) United States Patent
De'Longhi et al.

(10) Patent No.: US 10,888,192 B2
(45) Date of Patent: Jan. 12, 2021

(54) DEVICE FOR EMULSIFYING A MILK-BASED BEVERAGE FOR COFFEE MACHINES

(71) Applicant: De'Longhi Appliances S.R.L., Treviso (IT)

(72) Inventors: Giuseppe De'Longhi, Treviso (IT); Paolo Evangelisti, Bologna (IT); Stefano Quaresimin, Tombolo (IT)

(73) Assignee: De'Longhi Appliances S.R.L., Treviso (IT)

( * ) Notice: Subject to any disclaimer, the term of this patent is extended or adjusted under 35 U.S.C. 154(b) by 306 days.

(21) Appl. No.: 15/765,139

(22) PCT Filed: Sep. 29, 2016

(86) PCT No.: PCT/EP2016/073310
§ 371 (c)(1),
(2) Date: Mar. 30, 2018

(87) PCT Pub. No.: WO2017/055480
PCT Pub. Date: Apr. 6, 2017

(65) Prior Publication Data
US 2018/0271316 A1    Sep. 27, 2018

(30) Foreign Application Priority Data

Sep. 30, 2015   (IT) .................. 102015000057006

(51) Int. Cl.
*A47J 31/44*    (2006.01)
(52) U.S. Cl.
CPC ....... *A47J 31/4485* (2013.01); *A47J 31/4489* (2013.01)

(58) Field of Classification Search
CPC .................. A47J 31/4485; A47J 31/4489
See application file for complete search history.

(56) References Cited

U.S. PATENT DOCUMENTS 4,949,631 A    8/1990 Fregnan
4,960,042 A    10/1990 Grossi
(Continued)

FOREIGN PATENT DOCUMENTS

CN    103505050 A  *  1/2014    .......... A47J 31/4485
DE    19611450 C1    7/1997

OTHER PUBLICATIONS

Machine Translation of CN103505050A, published Jan. 15, 2014. "Milk foaming device for coffee maker". By Lou Yangling; Jiang Weifeng.*
(Continued)

*Primary Examiner* — David P Bryant
*Assistant Examiner* — Nirvana Deonauth
(74) *Attorney, Agent, or Firm* — Blank Rome LLP

(57) ABSTRACT

The device for emulsifying a milk-based beverage for coffee machines comprising, operatively associated with one another, a main steam connector (2) for connecting to the coffee machine (3), an intake tube (5) for drawing milk from a milk container (4), a mixing body (6), a steam connector (7) with a reducing hole (8) placed between said mixing body (6) and said main connector (2), a mixing element (9) and a stabilizing element (10) associated with the mixing body (6), the main steam connector (2) comprising a first safety means (11) for the safe connection thereof to said coffee machine and second safety means (12) for the limited rotation of the head of the head (13) of the main connector (2) so as to direct the emulsified beverage into a container (14).

13 Claims, 10 Drawing Sheets

(56) References Cited

U.S. PATENT DOCUMENTS

| | | | | |
|---|---|---|---|---|
| 2014/0327162 A1* | 11/2014 | Aeberhard | .......... | A47J 31/4485 |
| | | | | 261/161 |
| 2015/0335197 A1* | 11/2015 | Moon | ................ | A47J 31/3633 |
| | | | | 99/295 |
| 2016/0000260 A1* | 1/2016 | De'Longhi | ............. | A47J 31/46 |
| | | | | 99/453 |
| 2017/0303735 A1* | 10/2017 | Balkau | ................ | A47J 31/4485 |

OTHER PUBLICATIONS

International Search Report dated Jan. 23, 2017; International Application No. PCT/EP2016/073310; International Filing Date Sep. 29, 2016; 3 pages.
Written Opinion dated Jan. 23, 2017; International Application No. PCT/EP2016/073310; International Filing Date Sep. 29, 2016; 5 pages.
English translation; German Application No. 19611450; Publication Date Jul. 3, 1997; 11 pages.

* cited by examiner

DEVICE FOR EMULSIFYING A MILK-BASED BEVERAGE FOR COFFEE MACHINES

RELATED APPLICATIONS

This application is a U.S. national phase application of International Application No. PCT/EP2016/073310, filed Sep. 29, 2016; which application claims priority to Italy Application No. 102015000057006, filed Sep. 30, 2015. Each of the above-identified related applications are incorporated by reference.

FIELD OF USE

The present invention relates to a device for emulsifying a milk-based beverage for coffee machines.

BACKGROUND OF THE INVENTION

As is well known, at present, the present devices for emulsifying milk to prepare, for example, cappuccino and the like, substantially have drawbacks due to a higher or lower degree of efficiency, but what holds considerable importance is the degree of safety and the ease of thoroughly cleaning the various components.

User safety, in fact, has drawn increasing attention from manufacturers of coffee machines for reasons that are easy to imagine and the possibility of achieving optimal cleaning of the device in a simple and rapid manner becomes an essential element in the choice of a coffee machine, taking into account the known problems that result in milk residues in these devices.

SUMMARY OF THE INVENTION

The task of the present invention is to provide a device for emulsifying a milk-based beverage for coffee machines which eliminates the aforementioned technical drawbacks of the prior art.

Within the scope of this task, one object of the invention is to provide a device for emulsifying a milk-based beverage for coffee machines in which all the elements subject to pressure and possible impacts or carelessness on the user's part have a high degree of safety.

Another object of the invention is to provide a device for emulsifying a milk-based beverage for coffee machines in which all the elements exposed to milk or steam can be easily washed and disassembled from one another.

A further object of the invention is to provide a device for emulsifying a milk-based beverage for coffee machines which has the possibility of being inserted from the front and connected to the coffee machine irrespective of the precision with which the user operates.

Yet a further object of the invention is to provide a device for emulsifying a milk-based beverage for coffee machines that compensates for the manual abilities of the user in the connection and disconnection thereof to and from both the coffee machine and the milk container, as well as in the dispensing of the emulsion into a container without causing splashes, irrespective of its size.

This task, as well as these and other objects, are achieved by a device for emulsifying a milk-based beverage for coffee machines, comprising, operatively associated with one another, a main steam connector for connecting to the coffee machine, an intake tube for drawing milk from a milk container, a mixing body, a steam connector with a reducing hole placed between said mixing body and said main connector, a mixing element and a stabilizing element associated with said mixing body, characterized in that said main steam connector comprises a first safety means for the safe connection thereof to said coffee machine and a second safety means for the limited rotation of the head of said main connector so as to direct said emulsified beverage into a container.

Additional features of the present invention are defined, moreover, in the claims dependent on the main claim, which better clarify the structure of the device.

BRIEF DESCRIPTION OF THE DRAWINGS

Additional features and advantages of the invention will become more apparent from the description of a preferred, but not exclusive, embodiment of the device for emulsifying a milk-based beverage for coffee machines according to the invention, illustrated by way of non-limiting example in the appended drawings, in which.

Figure 1:
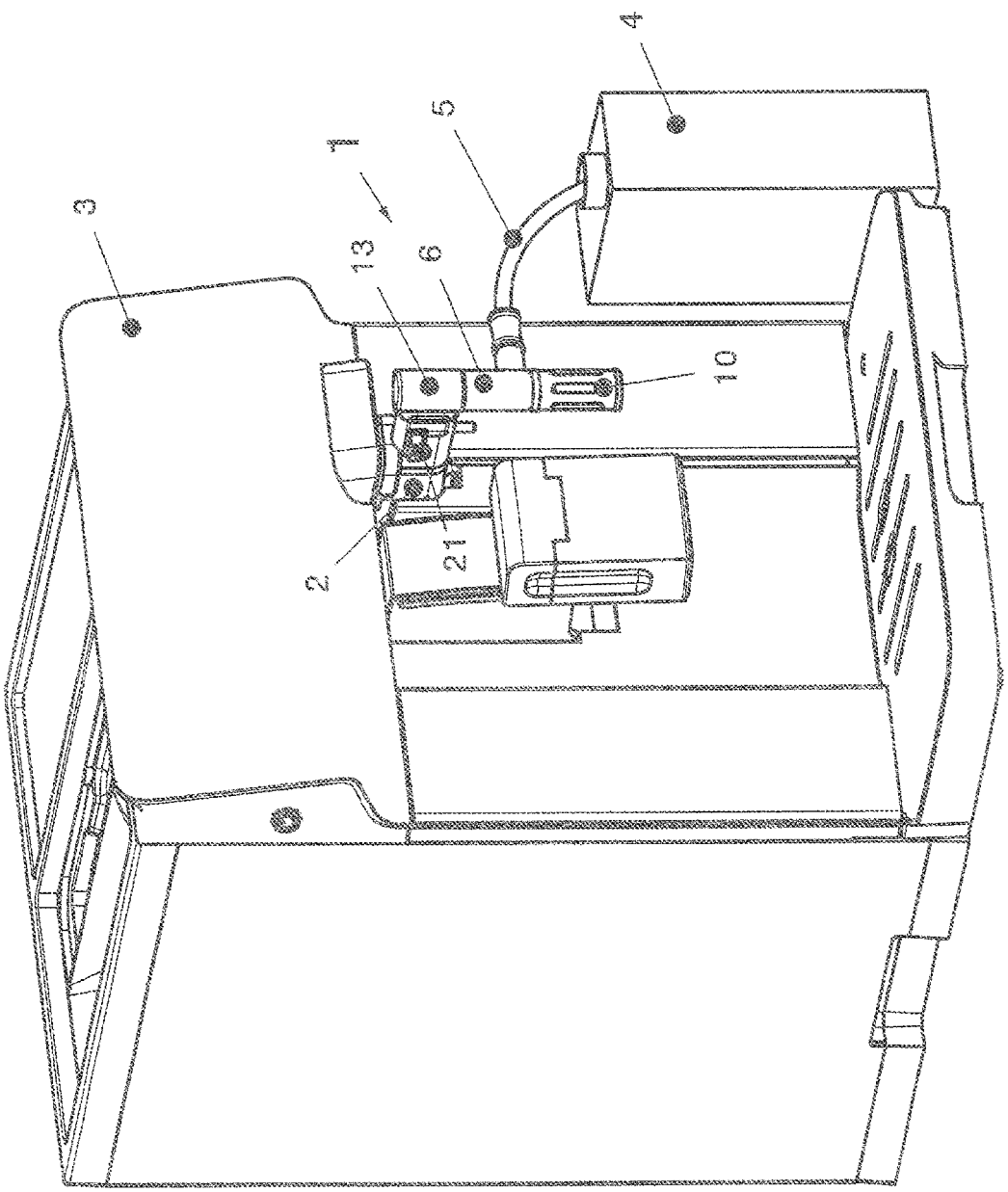
FIG. 1 is a perspective view of the device associated with a coffee machine according to the invention.
Figure 2:
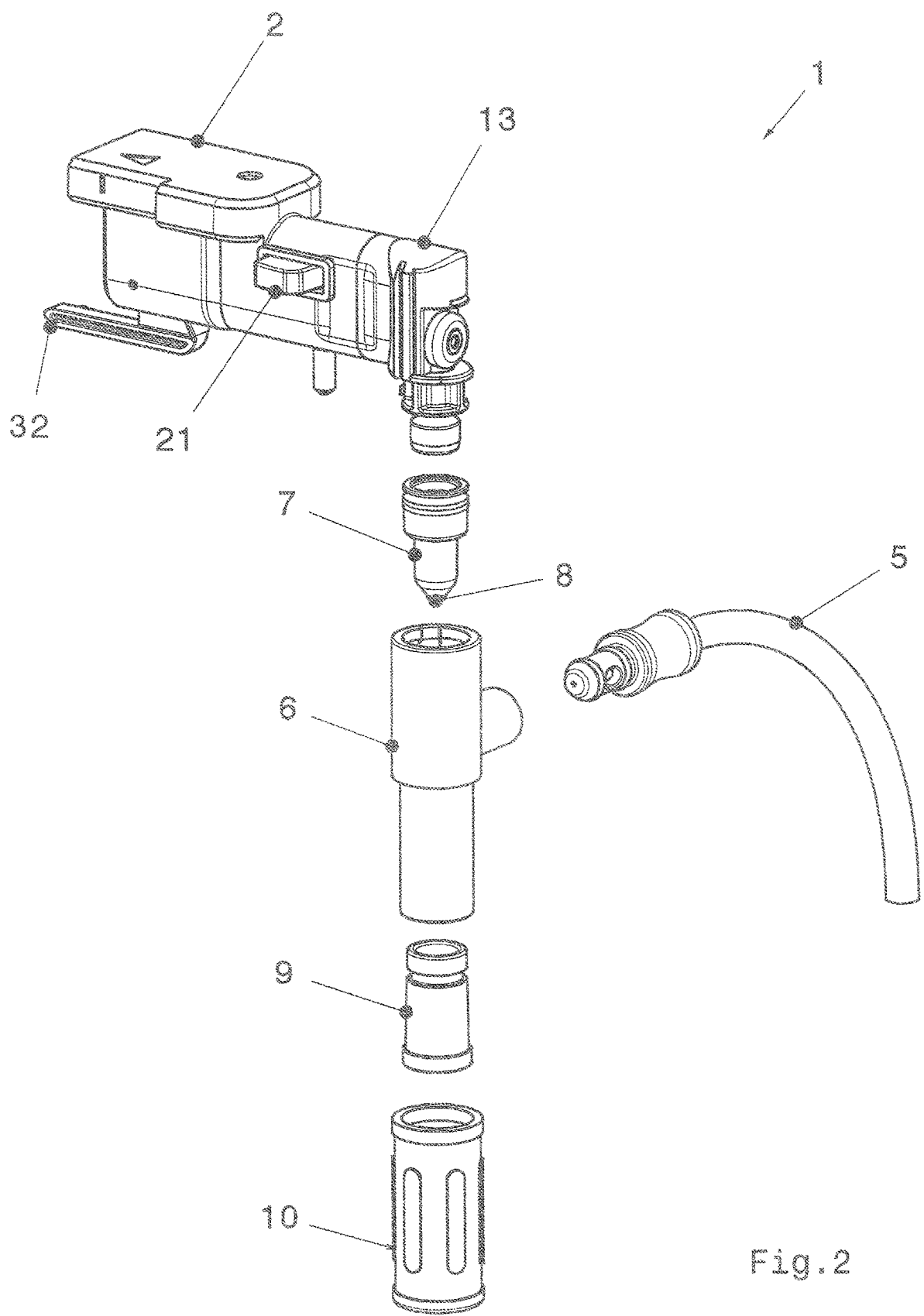
FIG. 2 is an exploded perspective view of the device according to the invention.
Figure 3:
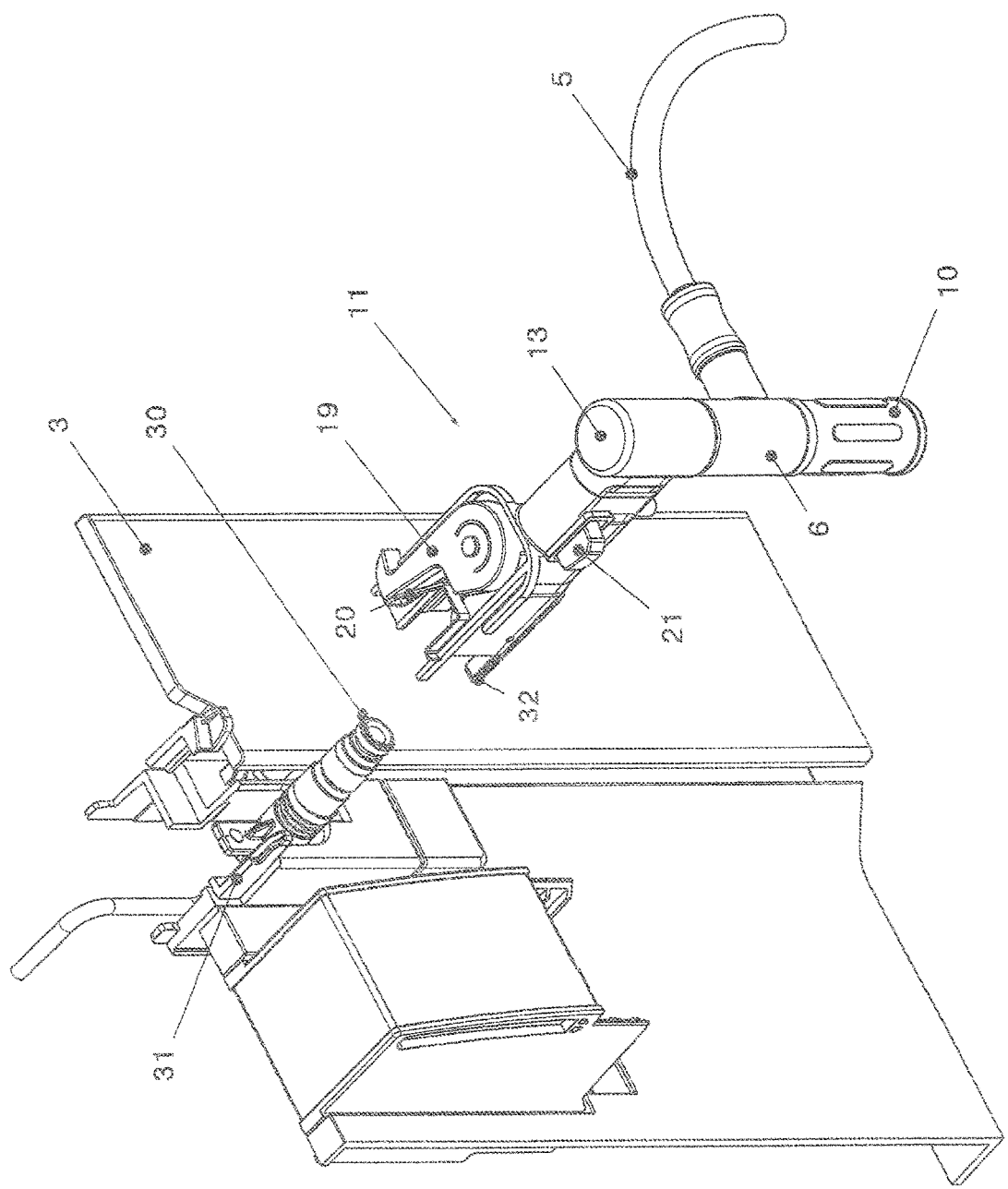
FIG. 3 is a partial, detailed perspective view of the device partially open and the coffee machine according to the invention.
Figure 4:
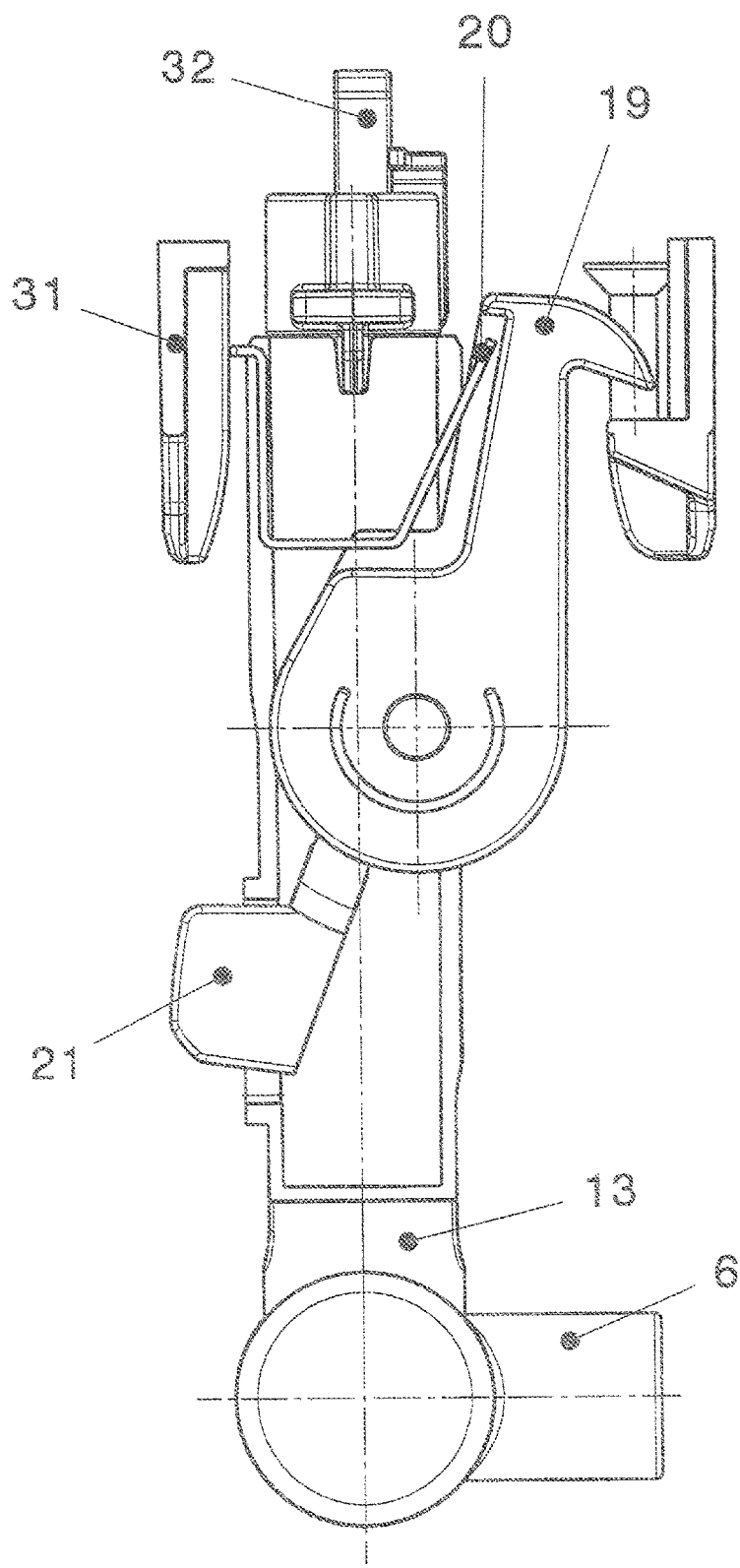
FIG. 4 is a schematic view from above of the first safety means according to the invention.
Figure 5:
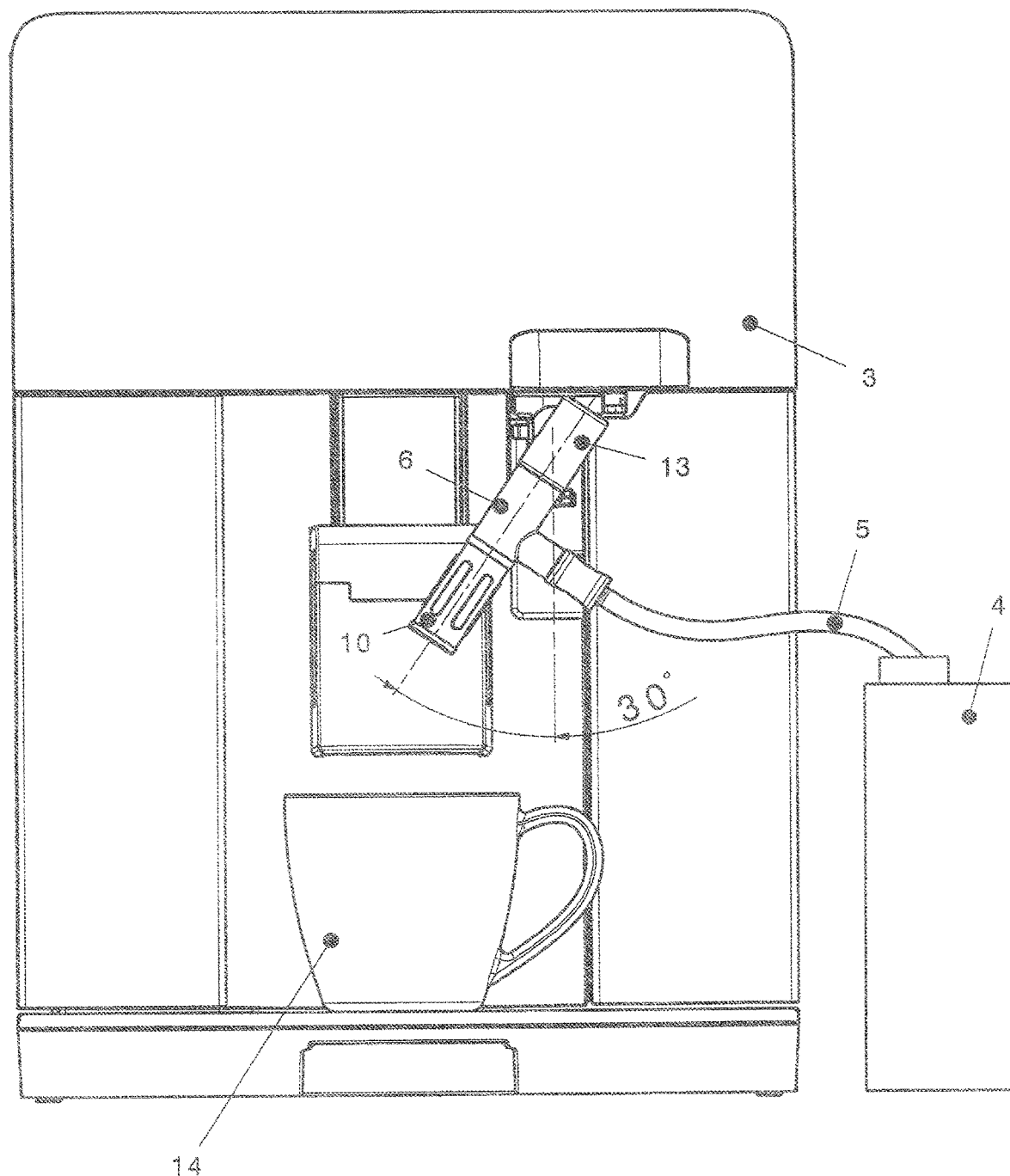
FIG. 5 shows the possibility of rotating the head of the device according to the invention.
Figure 6:
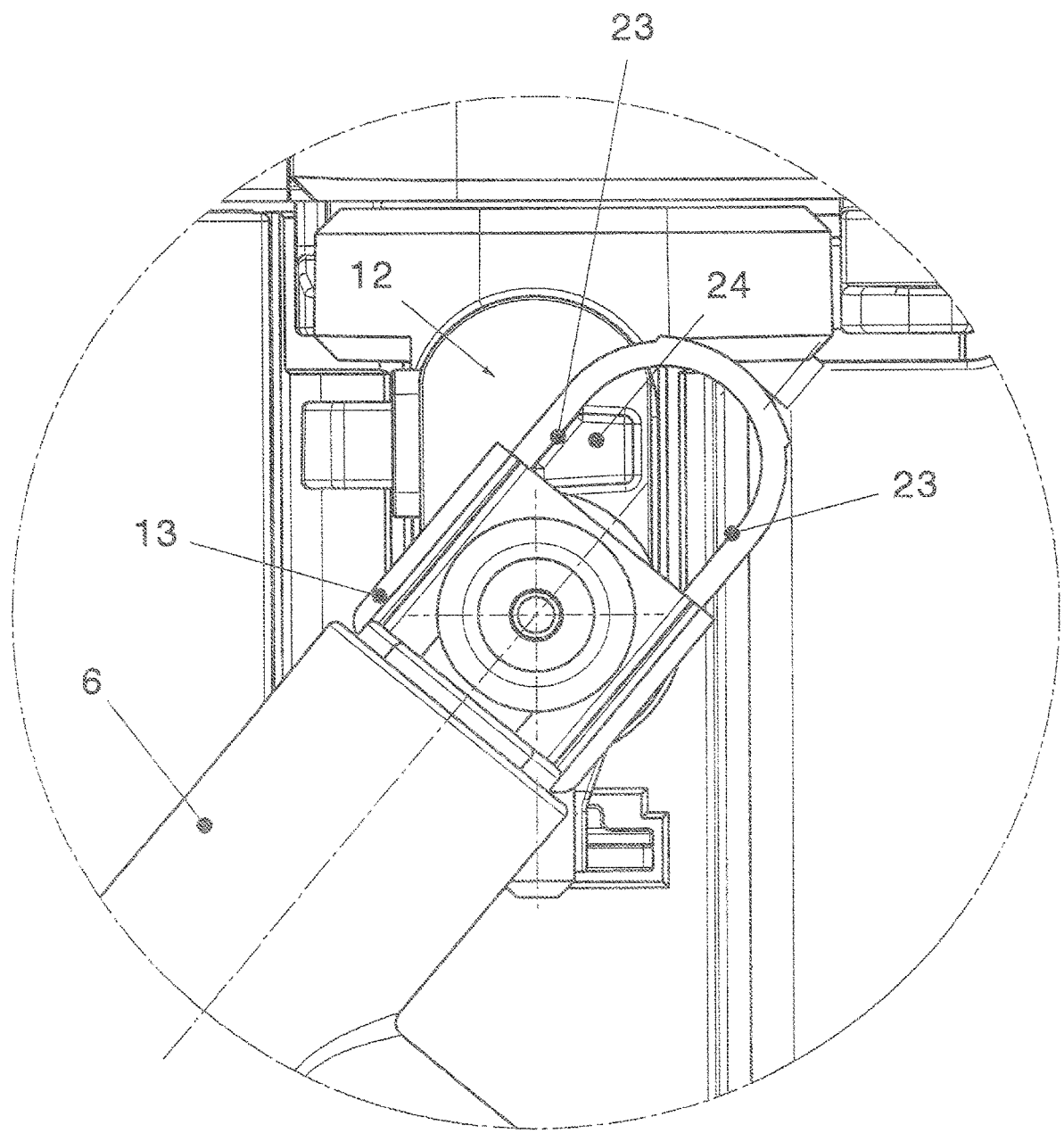
FIG. 6 schematically shows the second safety means according to the invention.
Figure 7:
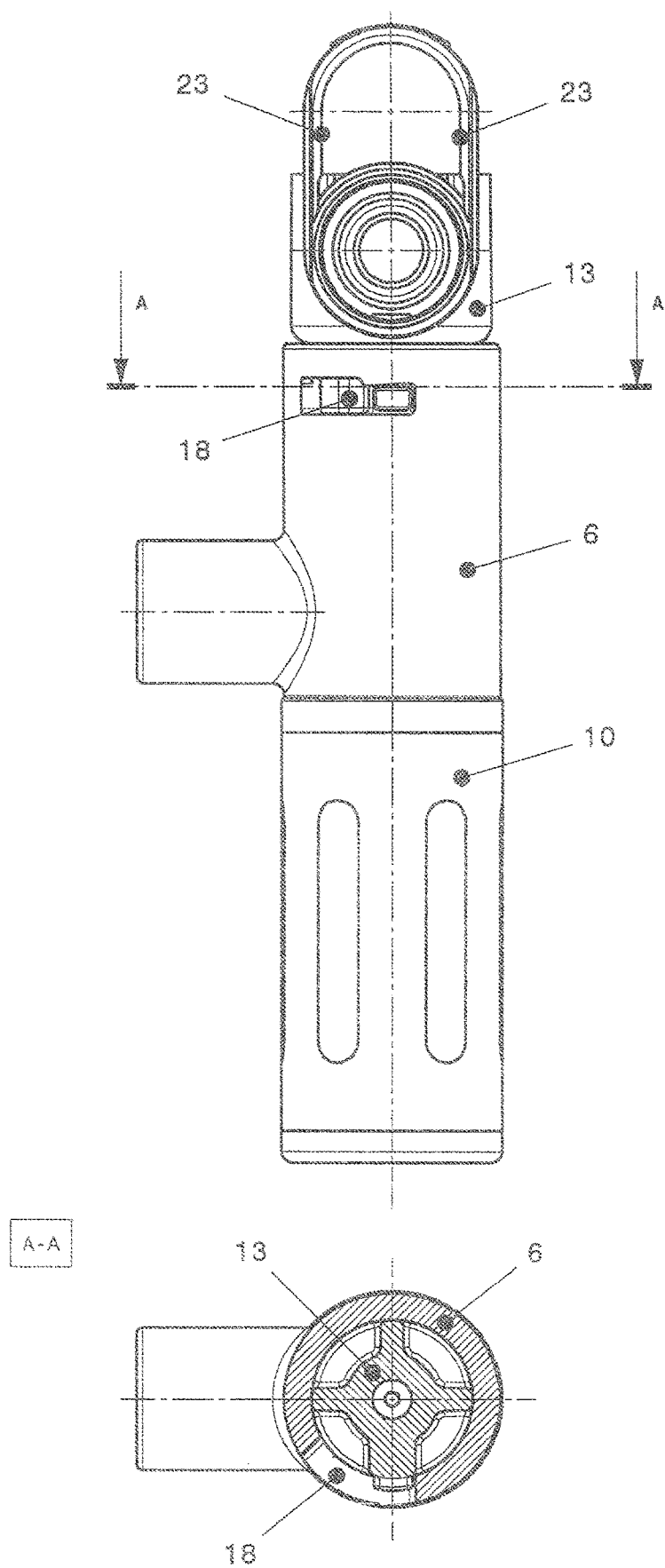
FIG. 7 is a partial view of the mixing body connected to the rotating head by means of a bayonet system according to the invention.
Figure 8:
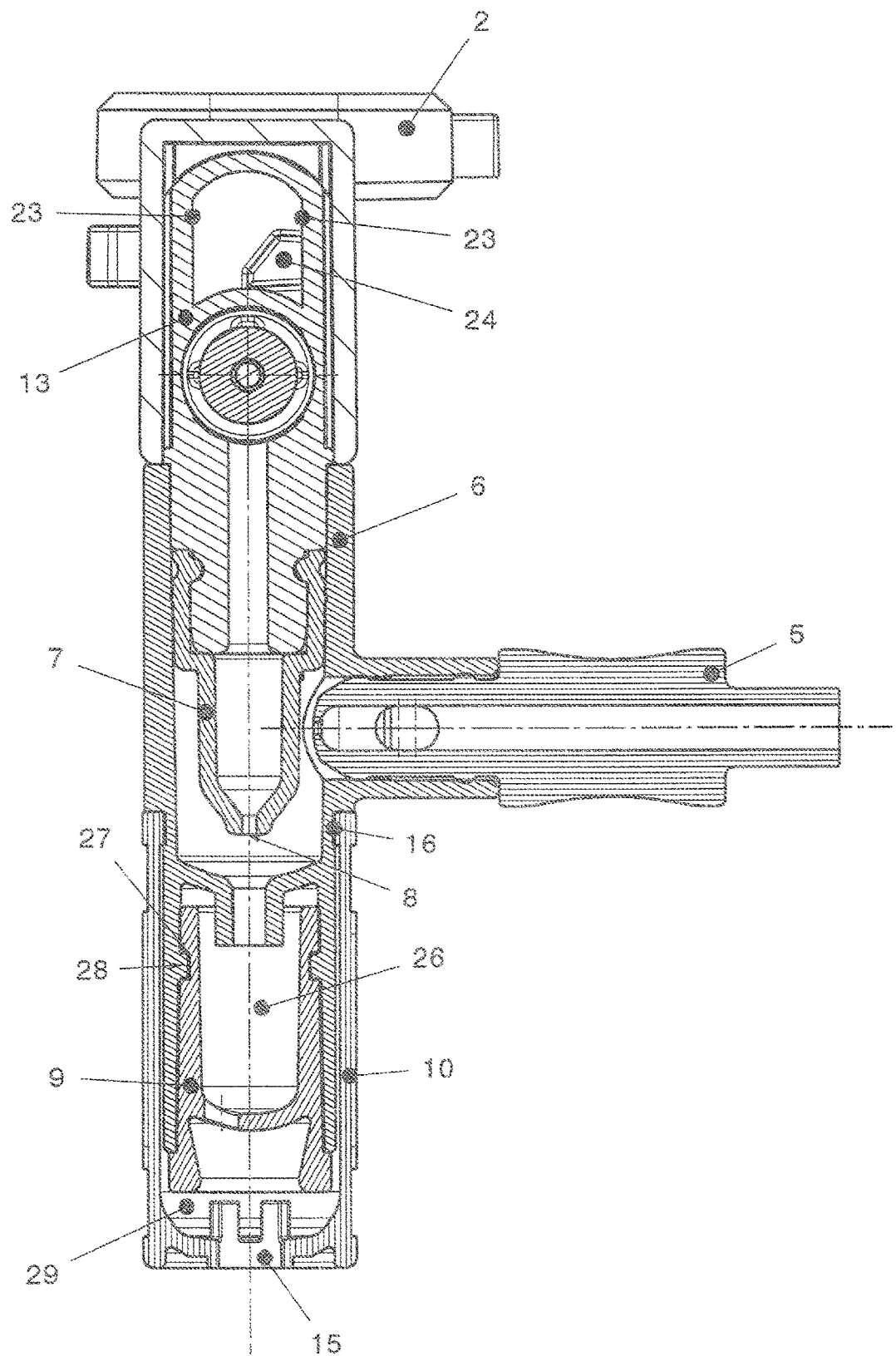
FIG. 8 is a front sectional elevation view of the device according to the invention.
Figure 9:
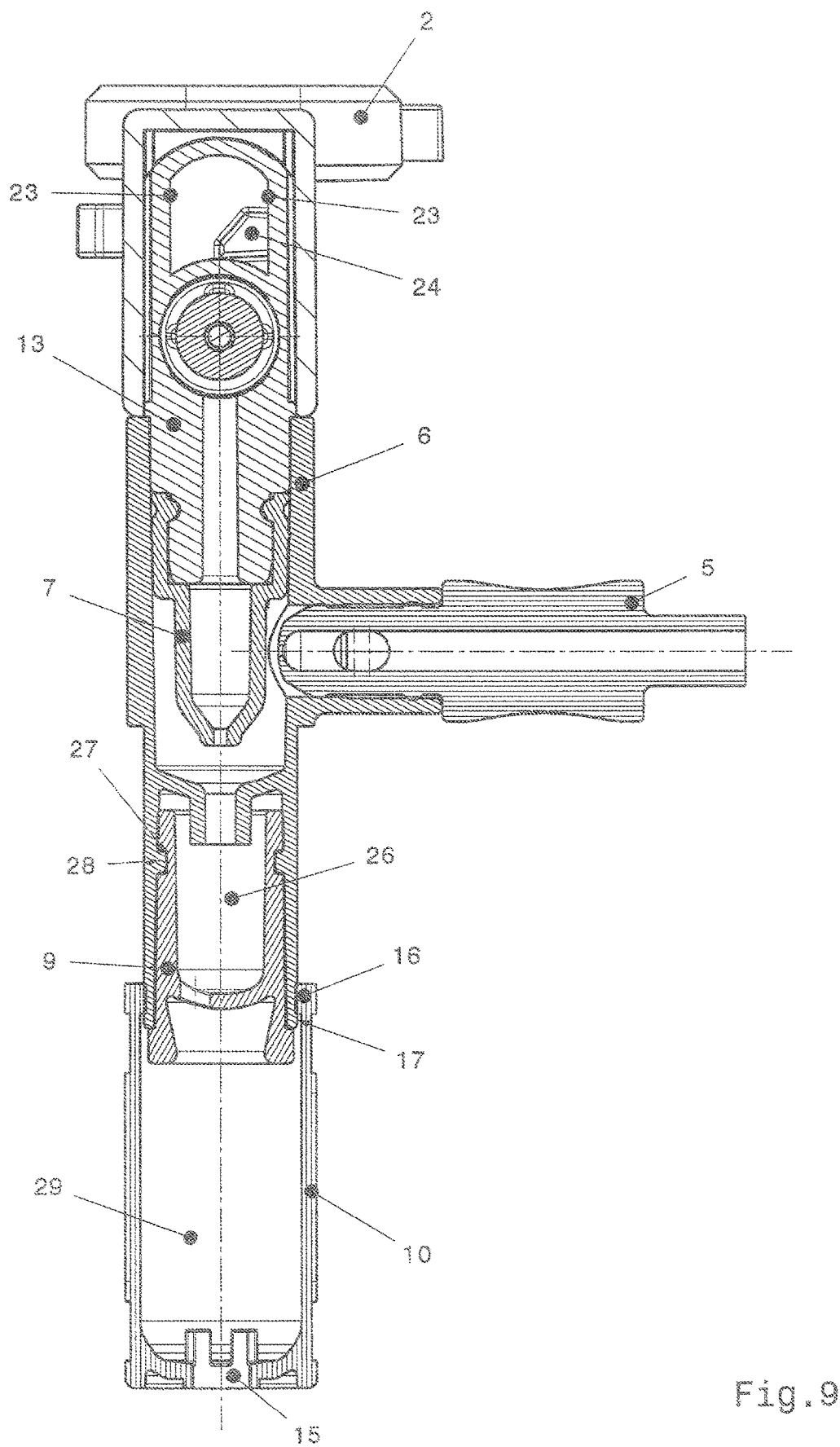
FIGS. 9 and 10 are front sectional elevation views of the device in which the movement of the stabilizing element according to the invention can be seen.
Figure 10:
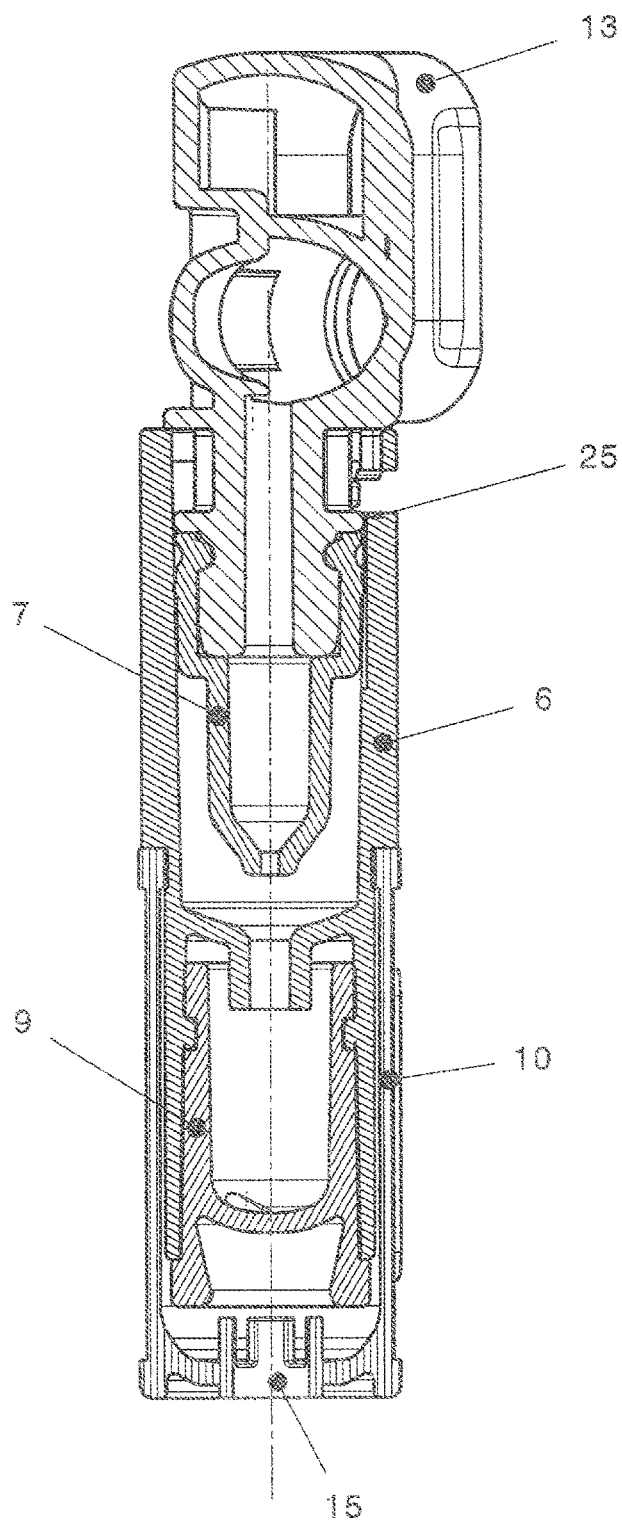

With reference to the aforesaid figures, they show a device for emulsifying a milk-based beverage for coffee machines.

DETAILED DESCRIPTION OF THE ILLUSTRATED EMBODIMENTS

With reference to the above-described figures, the device for emulsifying a milk-based beverage for coffee machines is denoted in its entirety by the reference number 1.

The device 1 comprises a main steam connector 2 which is associated with the coffee machine 3 in such a way that the dispensing of steam therefrom under pressure generates a vacuum, by virtue of the Venturi effect, capable of drawing a pre-established amount of milk present in a milk container 4 through an intake tube 5 for drawing milk.

The device 1 further has a mixing body 6, a steam connector 7, provided with a reducing hole 8 for regulating the steam pressure, placed between the mixing body 6 and the main connector 2.

A mixing element 9 for mixing air with the milk and steam and a stabilizing element 10 for stabilizing the emulsion obtained are associated with the mixing body 6.

Advantageously, the main steam connector 2 comprises a first safety means, denoted in its entirety by the number 11, for the safe connection thereof to the coffee machine 3, and a second safety means, denoted in its entirety by the number 12, for the limited rotation of the head 13 of the main connector 2 so as to direct the emulsified beverage through the stabilizing element 10 into a container 14, which can be a cup of varying size.

Conveniently, the stabilizing element 10 has a mouth 15 for dispensing the emulsified beverage and is slidably associates with the mixing body 6 via an annular enlargement 16 and is retained thereto, in its outermost position, by means of an annular tooth 17.

In this manner it is possible, in a simple and fast manner, to bring the mouth 15 near to the container 14 according to its height, thereby avoiding any splashes of milk emulsion towards the outside of the same.

Conveniently, the milk intake tube 5 is made of an elastically deformable material so as to be adaptable to any milk container and above all so as to be capable of assuming different conformations depending on the degree of rotation of said head 13 without coming out of the container 4.

The mixing body 6 has a removable connecting means and in particular a bayonet connection 18 for connecting to the head 13.

The bayonet 18 is activated by means of a roto-translational movement, which on the one hand makes the connection safe even in the case of high pressure and accidental impacts and on the other hand can be easily detached by the user in order to clean all the elements making up the device.

The first safety means 11 comprises at least one hook 19 that is movable in opposing rotation and by means of the action of an elastic means, in particular a spring 20.

A pushbutton 21 is provided so as to bring the hook 19 from a position of engagement with the coffee machine 3 to a position of disengagement therefrom. The second safety means 12 comprises two opposing walls 23, present inside the head 13, which are capable of selectively engaging with an end stop 24 having an inclined rest surface, present inside the main steam connector 2, so that the head 13 is able to rotate by up to 45°, but preferably by around 30°, in order to direct the emulsion into the central zone of the container 14 and prevent it from being directed by mistake in the vicinity of the machine.

The mixing body 6 also has a calibrated air intake channel 25 which substantially extends between it and the side of the steam connector 7.

The mixing element 9 is made of elastically deformable material and internally has a mixing chamber 26 and is connected to the mixing body 6 thanks to its elasticity, which enables the annular recess 27 to engage the ring 28 fashioned on the mixing body 6.

Advantageously, the stabilizing element 10 is also made of an elastically deformable material and internally has a stabilization chamber 29 of a volume which varies proportionally to the movement of the stabilizing element 10 so as to bring the mouth thereof 15 close to the container 14.

The main steam connector 2 engages with a steam coupling 30 provided on the coffee machine 3, thus ensuring a progressive seal thanks to the fact of being tapered and coupled with a channel having a shape mating therewith located inside said main connector 2.

Not least importantly, it should be noted that the main connector 2 engages with the coffee machine frontally by means of first and second sliding guides 31 and 32 that are asymmetrical to each other and, together with the taper of the steam coupling 30, ensure compensation for any vertical and horizontal inclinations during insertion, by the user, of the device 1 in the coffee machine 3.

It has been observed in practice that the device for emulsifying a milk-based beverage for coffee machines is especially advantageous, since it ensures a high degree of safety by preventing the accidental detachment thereof from the machine due either to an overpressure or impact or an incorrect insertion by the user.

Furthermore, advantageously, all elements of the device are easily detachable from one another and washable, thus ensuring a high degree of hygiene.

The device for emulsifying a milk-based beverage for coffee machines thus conceived is susceptible of numerous modifications and variants, all falling within the scope of the inventive concept; moreover, all the details are replaceable by technically equivalent elements.

The materials used, as well as the dimensions, may in practice be of any type, according to needs and the state of the art.

The invention claimed is:

1. A device for emulsifying a milk-based beverage for coffee machines, comprising, operatively associated with one another, a main steam connector (2) for connecting to the coffee machine (3), an intake tube (5) for drawing milk from a milk container (4), a mixing body (6), a steam connector (7) with a reducing hole (8) placed between said mixing body (6) and said main steam connector (2), a mixing element (9) and a stabilizing element (10) associated with said mixing body (6), wherein said main steam connector (2) comprises:
   a main body,
   a latching device (11) comprising at least one hook (19) movable by action of a spring and at least one pushbutton (21) to bring said hook (19) from a position of engagement with said coffee machine (3) to a position of disengagement therefrom, said latching device movable in opposing rotation and slidably securable to a coupling (30) of the coffee machine (3) along an axis of connection therewith, the latching device (11) biased for securement to the coupling (30) and configured to oppose rotation of said main steam connector (2) relative to the coffee machine (3) upon securement for safe connection of said main steam connector (2) to said coffee machine; and
   a rotatable connector (12) configured for limited rotation of a head (13) of said main steam connector (2) relative to said main body of said main steam connector (2): where, upon securement of said main steam connector (2) to the coffee machine (3), the rotatable connector (12) is configured to direct said emulsified beverage, along a dispensing axis, into a container (14), about any of a limited range of angles of the dispensing axis relative to a vertical dispensing axis.

2. The device according to claim 1, wherein said stabilizing element (10) has a mouth (15) for dispensing said emulsified beverage and is slidably associated with said mixing element (9) to bring said mouth (15) near to said container (14).

3. The device according to claim 1, wherein said intake tube (5) is made of elastically deformable material capable of assuming different conformations depending on a degree of rotation of said head (13).

4. The device according to claim 1, wherein said mixing body (6) is removably connectable to said head (13) by a roto-translational connector.

5. The device according to claim 1, wherein said rotatable connector (12) comprises two opposing walls (23) present inside the head (13) and capable of selectively engaging with an end stop (24) present inside said main steam connector (2).

6. The device according to claim 1, wherein said head (13) is able to rotate by up to 45°.

7. The device according to claim 1, wherein said mixing body (6) has a calibrated air intake channel (25).

8. The device according to claim 1, wherein said mixing element (9) is made of elastically deformable material and internally has a mixing chamber (26).

9. The device according to claim 2, wherein said stabilizing element (10) is made of elastically deformable material and internally has a stabilization chamber (29) of a volume which varies proportionally to movement of said mixing body (6) to bring said mouth (15) close to said container (14).

10. The device according to claim 1, wherein said main steam connector (2) engages with a steam coupling (30) provided on said coffee machine (3), said steam coupling (30) being tapered to couple with a channel having a shape mating therewith located inside said main steam connector (2).

11. The device according to claim 1, wherein said main steam connector (2) engages with said coffee machine (3) frontally by means of first and second sliding guides (31, 32) that are asymmetrical to each other.

12. The device according to claim 1, wherein the steam connector (7) with the reducing hole (8) is supported by the rotatable head (13) of the main steam connector (2), the steam connector (7) being aligned along the dispensing axis.

13. The device according to claim 1, wherein said rotatable connector (12) comprises two opposing walls (23) present inside the head (13), where a first opposing wall is configured to engage with an inclined rest surface of an end stop (24) at a dispensing state where the dispensing axis is inclined relative to vertical, and where the second opposing wall is configured to engage with a vertical rest surface of the end stop (24) at a dispensing state where the dispensing axis is vertical.

* * * * *